United States Patent
Tani

(10) Patent No.: US 7,212,478 B2
(45) Date of Patent: May 1, 2007

(54) DATA ASSURANCE METHOD FOR OPTICAL STORAGE MEDIA AND OPTICAL STORAGE DEVICE

(75) Inventor: Hiroshi Tani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/254,498

(22) Filed: Oct. 20, 2005

(65) Prior Publication Data

US 2006/0067192 A1 Mar. 30, 2006

Related U.S. Application Data

(63) Continuation of application No. PCT/JP2003/007245, filed on Jun. 9, 2003.

(51) Int. Cl.
*G11B 7/00* (2006.01)

(52) U.S. Cl. .................. 369/53.12; 369/116; 369/47.1

(58) Field of Classification Search ...................... None
See application file for complete search history.

(56) References Cited

U.S. PATENT DOCUMENTS 6,067,284 A * 5/2000 Ikeda et al. ................. 369/116

6,333,827 B1 * 12/2001 Hamamoto et al. ........ 369/13.05
6,600,715 B2 * 7/2003 Okumura et al. ......... 369/275.1
2003/0156519 A1 * 8/2003 Yokoi ....................... 369/59.11

FOREIGN PATENT DOCUMENTS

| JP | 2-101675 | 4/1990 |
|---|---|---|
| JP | 4-076843 | 3/1992 |
| JP | 4-167230 | 6/1992 |
| JP | 4-170722 | 6/1992 |
| JP | 4-283435 | 10/1992 |
| JP | 7-050019 | 2/1995 |
| JP | 10-289500 | 10/1998 |
| JP | 2002-237044 | 8/2002 |

* cited by examiner

*Primary Examiner*—William Korzuch
*Assistant Examiner*—Joseph Haley
(74) *Attorney, Agent, or Firm*—Greer, Burns & Crain, Ltd.

(57) ABSTRACT

A data assurance method controls an optical head according to the difference between the device temperature and the temperature of inserted removable optical storage media. A rate of temperature change c is calculated from the output of a temperature sensor which detects the device temperature, and then the temperature of the media is estimated. A transition is made to special processing, and a return is made from special processing in a state with a temperature difference to normal processing depending on the rate of temperature change. Consequently a return to normal processing can be made safely and quickly.

20 Claims, 10 Drawing Sheets

LASP TIME FROM MEDIA INSERTION [SECOND]

LASP TIME FROM MEDIA INSERTION [SECOND]

FIG. 5

| TABLE WHEN (DEVICE−MEDIA)=25°C | | TABLE WHEN (DEVICE−MEDIA)=10°C | |
|---|---|---|---|
| LASP TIME [s] | MEDIA TEMP FOR INITIAL DEVICE TEMP [°C] | LASP TIME [s] | MEDIA TEMP FOR INITIAL DEVICE TEMP [°C] |
| 0 | −25.0 | 0 | −10.0 |
| 15 | −21.0 | 15 | −8.0 |
| 30 | −17.5 | 30 | −6.0 |
| 45 | −15.5 | 45 | −5.0 |
| 60 | −13.0 | 60 | −4.0 |
| 75 | −11.5 | 75 | −3.0 |
| 90 | −9.5 | 90 | −2.5 |
| 105 | −8.0 | 105 | −2.0 |
| 120 | −7.0 | 120 | −1.7 |
| 135 | −6.0 | 135 | −1.4 |
| 150 | −5.5 | 150 | −1.1 |
| 165 | −4.5 | 165 | −0.9 |
| 180 | −4.0 | 180 | −0.7 |
| 195 | −3.5 | 195 | −0.5 |
| 210 | −3.0 | 210 | −0.3 |
| 225 | −2.5 | 225 | −0.1 |
| 240 | −2.0 | 240 | 0.0 |
| 270 | −1.7 | 270 | 0.0 |
| 300 | −1.0 | 300 | 0.0 |
| 360 | −0.5 | 360 | 0.0 |
| 450 | 0.0 | 450 | 0.0 |

30  32

LASP TIME FROM MEDIA INSERTION [SECOND]

DATA ASSURANCE METHOD FOR OPTICAL STORAGE MEDIA AND OPTICAL STORAGE DEVICE

CROSS-REFERENCE TO RELATED APPLICATIONS

This application is a continuation of international application PCT/JP2003/007245, filed on Jun. 9, 2003.

TECHNICAL FIELD

This invention relates to a data assurance method for optical storage media on which data is written by means of optical energy when the optical storage media is irradiated with light, and to such an optical storage device, and in particular relates to an optical storage media data assurance method and optical storage device to provide assurance of the data on the optical storage media when there is a difference in temperatures between removable optical storage media and the optical storage device.

BACKGROUND ART

Advances in optical storage media have been rapid, and in addition to such ROM (Read-Only Memory) media as CD-ROM and DVD-ROM, RAM (Random Access Memory) media such as CD-R, DVD-R, CD-RW, DVD-RW, and MO (Magneto-Optical) media have also come into use.

Such writeable optical storage media include dye type, phase-change type, and magneto-optical type media; in all cases, however, optical energy causes heating, to induce a dye change, phase change, or magneto-optical change, in order to record data. The optical energy (called the write power) to record data must be adjusted to an appropriate value according to the optical storage media.

With increases in data storage capacities in recent years, data storage densities have risen, and fine control of the LD power (write power) during writing has become vital. Normally when the power to a device is turned on and media which has been in the same environment is inserted, the temperatures of the device and media rise substantially equally, and so the write LD power can be controlled so as to be ideal.

However, when for example media which has been brought indoors from a cold outdoor environment is inserted into a device which has been in a heated room, the temperature of the media rises rapidly, and time is required until the temperature is the same as the device temperature; consequently there is a shift in the write LD power from the ideal power during this time.

FIG. 13 is a diagram of the change with time in the write power necessary when media at low temperature is inserted into a device at high temperature; the horizontal axis plots the time from media insertion (seconds), and the vertical axis plots the required write power (mW).

As shown in FIG. 13, when low-temperature media (approximately 25° C.) is inserted into a high-temperature device (for example, approximately 54° C.), the write power required at the time of media insertion is approximately 12.5 mW, but 600 seconds after insertion of the media, the required write power is approximately 10.5 mW.

Thus in methods in which the write power is adjusted through test writing at the time of media insertion, a shift in the write power occurs, and in the worst case write errors or time-out errors at the higher-level host due to extended retries occur, possibly causing data loss.

In order to resolve this problem, in the prior art a method has been proposed in which a temperature sensor has been provided to detect the temperature of the device, the media temperature is estimated from the optimum write power obtained from the results of a test write (trial writing) at the time of media insertion, and the write power is adjusted based on both detected temperatures and the elapsed time (see for example Japanese Patent Laid-open No. 4-076843 (FIG. 2 and FIG. 4)).

Further, in the prior art a method has been proposed in which a temperature sensor to detect the temperature of the device and another temperature sensor to detect the temperature of an inserted media cartridge are provided, and when the difference in the temperatures detected by the two temperature sensors is greater than a prescribed value, recording, reproduction, and erasure are inhibited (see for example Japanese Patent Laid-open No. 2-101675).

On the other hand, the earlier the timing for returning to normal processing from special processing in a state in which there is a temperature difference, the greater the effect. Both techniques described above entail judgment only of the temperature difference between device and media, so that when there are rapid fluctuations in the temperatures of the device and media, there is danger in returning to normal processing with early timing. Consequently in order to safely return to normal processing, the temperature difference for the return timing must be made small, and so early return to normal processing is difficult.

Further, in the former technique of the prior art, the write power adjusted value (absolute value) for test writing is scattered due to the states of the media and device, so that test writing must be performed a plurality of times, the average value computed, and the media temperature estimated. Consequently time is required for test writing, and the wait time until the media can be accessed is too long.

Moreover, in a MSR (Magnetic Super-Resolution) type optical disk, changes in characteristics occur due to shifts in sensitivity and for other reasons, and it is difficult to estimate the media temperature from write power adjusted values during test writing.

In the latter technique of the prior art, in addition to a device temperature sensor, a media temperature sensor is necessary, resulting in increased equipment costs. And, detection of the temperature of inserted media is difficult, and in order to perform accurate temperature detection a high-sensitivity sensor is required, further increasing costs. In the case of removable optical storage media in particular, the state of insertion is not constant, so that scattering arises in the temperature detected by the temperature sensor of the media.

DISCLOSURE OF THE INVENTION

Hence an object of this invention is to provide a data assurance method for optical storage media and an optical storage device to safety and early return to normal processing from special processing according to the difference in the temperature of the device and the temperature of the removable optical storage media.

A further object of this invention is to provide a data assurance method for optical storage media and an optical storage device to estimate, rapidly and comparatively accurately, the difference between the temperature of the device and the temperature of the removable optical storage media, and to assure data integrity.

A further object of this invention is to provide a data assurance method for optical storage media and an optical storage device to estimate, rapidly and comparatively accurately, the difference between the temperature of the device and the temperature of the removable optical storage media, without providing an expensive temperature sensor to detect the temperature of the media, and to assure data integrity.

A further object of this invention is to provide a data assurance method for optical storage media and an optical storage device to estimate, rapidly and comparatively accurately, the difference between the temperature of the device and the temperature of the removable optical storage media, even when changes occur in the characteristics of the optical recording media.

In order to attain these objects, a data assurance method of this invention for an optical storage device which optically reads from and writes to inserted removable optical storage media has a step of detecting the temperature of the optical storage device using a temperature sensor; a step of calculating the rate of temperature change from the detected temperature; a step of calculating the estimated temperature of the optical storage media based on the rate of temperature change; a step, according to the temperature difference between the device temperature of the temperature sensor and the estimated temperature, of changing, at least, the write conditions of an optical head performing the reading and writing to special conditions to accommodate the temperature difference from the normal conditions; and a step of detecting changes in the polarity of the rate of temperature change, and of returning from the special conditions to the normal conditions.

Further, an optical storage device of this invention has a temperature sensor which detects the temperature of the optical storage device, an optical head to read/write removable optical storage media, and a control unit which controls the optical head. And the control unit calculates the rate of temperature change from the detected temperature, determines the estimated temperature of the optical storage media based on the rate of temperature change, and according to the temperature difference between the device temperature measured by the temperature sensor and the estimated temperature, changes at least the write conditions of the optical head from the normal conditions to special conditions according to the temperature difference, detects changes in the polarity of the rate of temperature change, and returns from the special conditions to the normal conditions.

In this invention, the rate of temperature change is calculated from the output of a temperature sensor which detects the temperature of the device, and processing is returned to normal processing from special processing for a state in which there is a temperature difference, so that safe and early return to normal processing is possible. Further, the media temperature is estimated based on the rate of temperature change for a single temperature sensor, so that the media temperature can be estimated quickly and comparatively accurately, and the wait time until the media can be accessed can be shortened.

In this invention, it is preferable that the step of calculating the estimated temperature have a step of calculating, at the time of insertion of the optical recording media, the initial estimated temperature of the optical recording media from the rate of temperature change and the initial temperature of the device, and a step of determining the estimated temperature of the optical recording media, according to the temperature difference between the initial temperature of the device and the initial estimated temperature, by referencing a table storing temperature differences between the temperature of the device and the temperature of media, which takes as a parameter the time elapsed from insertion of the optical storage media.

In this feature of the invention, even though the media temperature is estimated based on the rate of temperature change, the media temperature can be estimated accurately and easily according to the temperature change characteristics.

In this invention, it is preferable that the data assurance method further have a step, when the difference between the detected device temperature and the estimated temperature of the optical storage media is equal to or greater than a first predetermined value, of preventing execution of read/write processing of the optical storage media, and that the changing step be executed when the temperature difference is smaller than the first predetermined value but equal to or greater than a second predetermined value. By this means, when the temperature difference is large write processing is halted without performing adjustment processing, so that even if the temperature difference is large, unnecessary adjustment processing can be prevented.

In this invention, it is preferable that the changing step has a step of increasing or decreasing the write power of the optical head according to the temperature difference. By this means, the write power can be adjusted appropriately.

In this invention, it is preferable that the changing step has a step of increasing or decreasing the write power of the optical head during write retry according to the temperature difference. By this means, the write retry power can be adjusted appropriately.

In this invention, it is preferable that the changing step has a step of changing the frequency of test writing to adjust the write power of the optical head according to the temperature difference. By this means, the number of adjustments of the write power can be increased or decreased, and the write power can be adjusted appropriately.

In this invention, it is preferable that the changing step has a step of disabling a write cache which stores write data in cache memory, according to the temperature difference. By this means, the loss of a large amount of data can be prevented in advance.

In this invention, it is preferable that the prevention step has a step of issuing an error response to a higher-level device. By this means, the higher-level device can learn of the temperature difference state and can take appropriate action.

In this invention, it is preferable that the changing step has a step of ejecting inserted optical storage media. By ejecting the media, write failures can be prevented in advance, and the user can be prompted to re-insert media after warming.

In this invention, it is preferable that the changing step has a step, after waiting a prescribed time, of performing read or write processing. By waiting a prescribed time, read and write processing can be performed after the temperature difference has become small, improving stability.

BRIEF DESCRIPTION OF THE DRAWINGS

FIG. 5 shows the configuration of the table of FIG. 2;

DESCRIPTION OF THE PREFERRED EMBODIMENTS

Below, embodiments of the invention are explained, in the order of an optical storage device, optical storage media access processing, W/R halt/wait processing, W/R condition switching processing, and other embodiments.

Optical Storage Device

Figure 1:
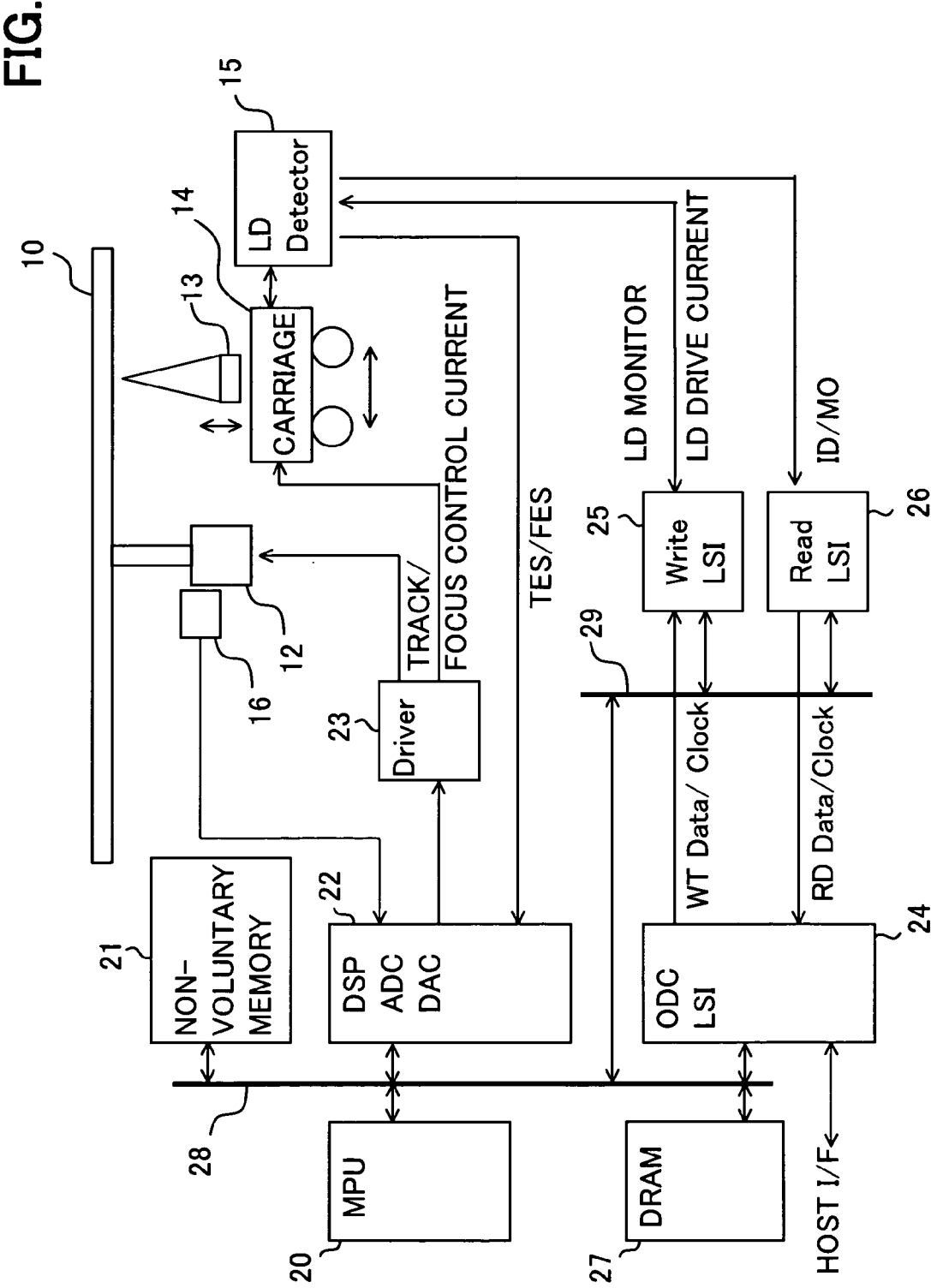
FIG. 1 shows the configuration of the optical storage media in an embodiment of the invention.

FIG. 1 shows the configuration of the optical storage media in an embodiment of the invention. FIG. 1 explains the optical storage media, taking as an example magneto-optical storage media.

As shown in FIG. 1, the optical storage media 10 comprises a magneto-optical disk. As is well known, the structure of this magneto-optical disk comprises, on a polycarbonate substrate, a first dielectric layer, of material such as silicon nitride (SiN) or tantalum oxide; a two-layer magneto-optical recording layer, comprising an amorphous alloy, such as TbFeCo or GdFeCo, of a rare earth element (Tb, Gd) and a transition metal (FeCo); a second dielectric layer, of the same material as the first dielectric layer; and a protective coating layer, of Al, Au or another metal as a reflective layer and an ultraviolet-hardening resin.

As shown in FIG. 1, the magneto-optical disk 10 is rotated by a spindle motor 12. The optical head 13 has an objective lens, focusing actuator, and tracking actuator. The optical head 13 is mounted on a carriage 14. The carriage 14 positions the optical head 13. The optical fixed portion 15 has a laser diode and a photodetector.

Light from the laser diode of the optical fixed portion 15 passes through the carriage (positioner) 14 and is incident on the optical head 13, and from the optical head 13 is incident on the magneto-optical disk 10. Light reflected from the magneto-optical disk 10 is incident on the optical head 13, then passes through the positioner 14 and is incident on the photodetector of the optical fixed portion 15.

The temperature sensor 16 detects the temperature within the device. The MPU 20 controls the entire device, and comprises a microprocessor. The nonvolatile memory 21 stores programs and data necessary for processing by the MPU 20.

The DSP (digital signal processor) 22 receives tracking error signals (TES) and focus error signals (FES) from the photodetector of the optical fixed portion 15, and performs focus control and tracking control. That is, the DSP 22 receives the tracking error signals TES and focus error signals FES from the photodetector of the optical fixed portion 15, and calculates tracking driving signals and focus driving signals.

The driver circuit 23 converts driving signals into driving currents, and outputs the results to the tracking actuator and focusing actuator of the optical head 13 and carriage 14. The optical disk control (ODC) circuit 24 controls the interface with the higher-level host. The ODC 24 outputs write data and a write clock, and receives read data, a read clock, and sector mark signals.

The write circuit 25 receives a laser light monitor signal LD from the optical fixed portion 15, and outputs the driving current for the laser diode. The read circuit 26 detects the read data (MO), read clock, and sector mark IDs from the read signal sent from the optical fixed portion 15.

Buffer memory (DRAM) 27 temporarily stores read data for the higher-level host and write data from the higher-level host. The address/data bus 28 connects the MPU 20, memory 21, DSP 22, ODC 24, and buffer memory 27. The second address/data bus 29 connects the write circuit 25, read circuit 26, and address/data bus 28.

The MPU 20 executes read/write control, and performs read/write assurance processing, described below.

Optical Storage Media Access Processing

Figure 2:
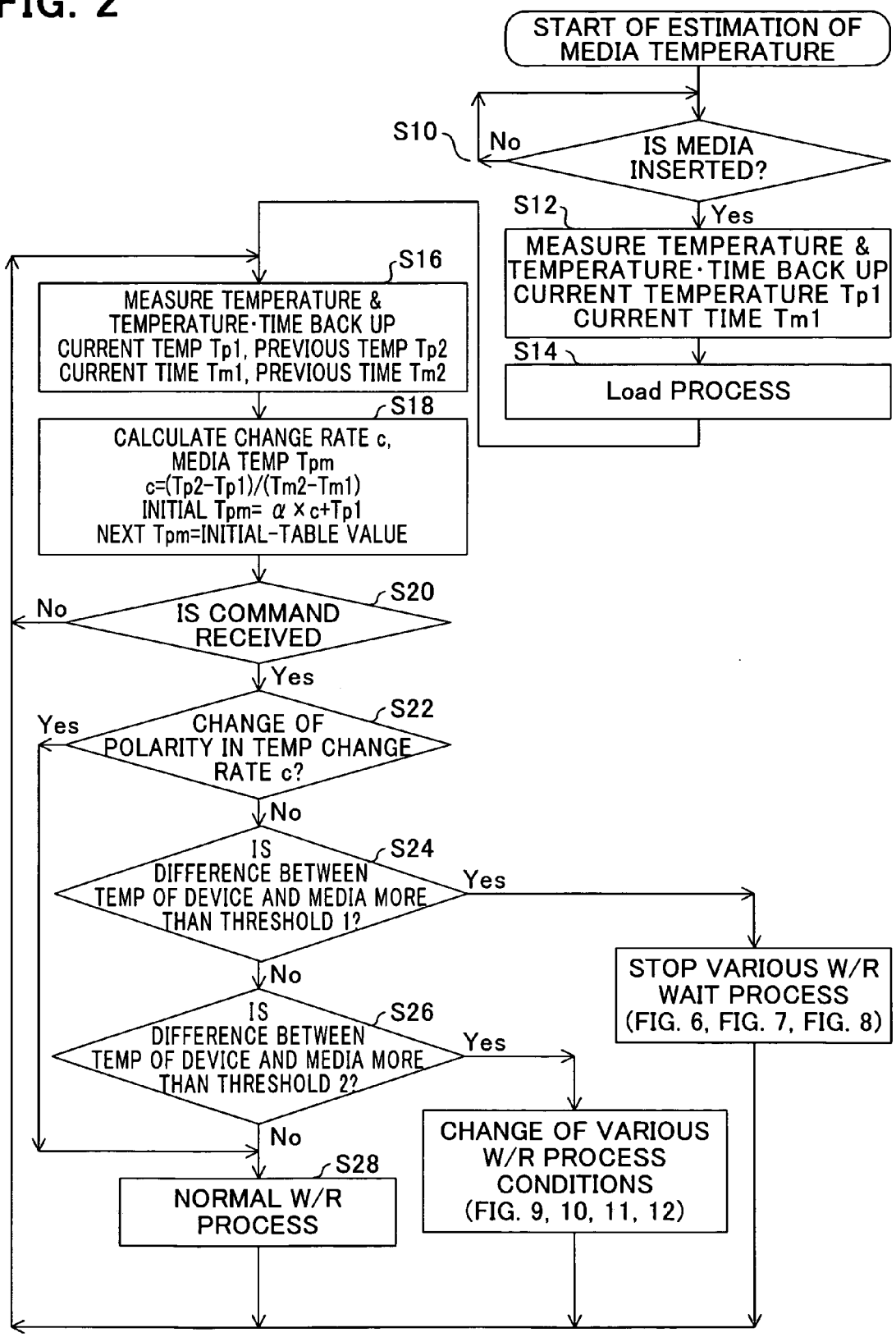
FIG. 2 shows the flow of access processing in an embodiment of the invention.
Figure 3:
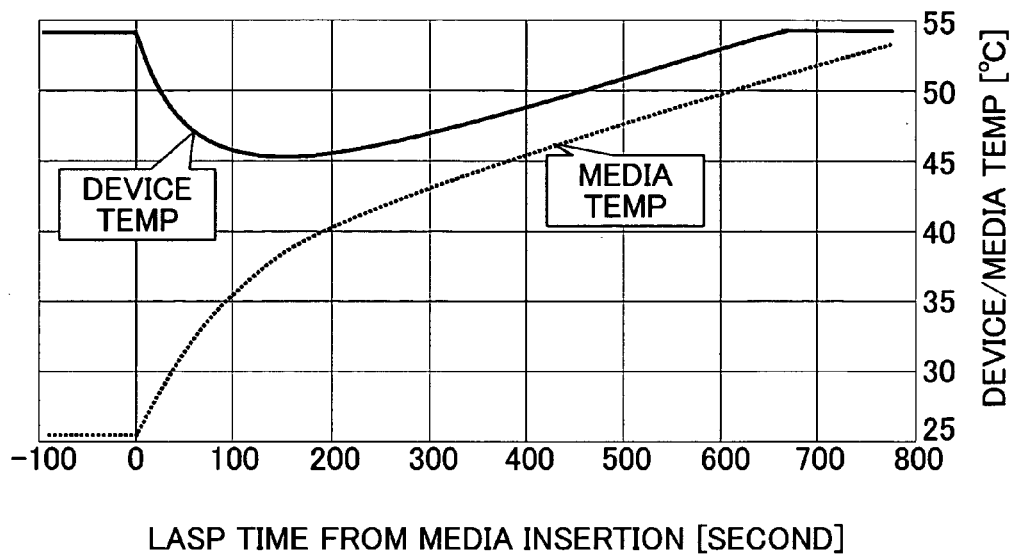
FIG. 3 is a diagram of changes in the temperature difference between the device and media of FIG. 2.
Figure 4:
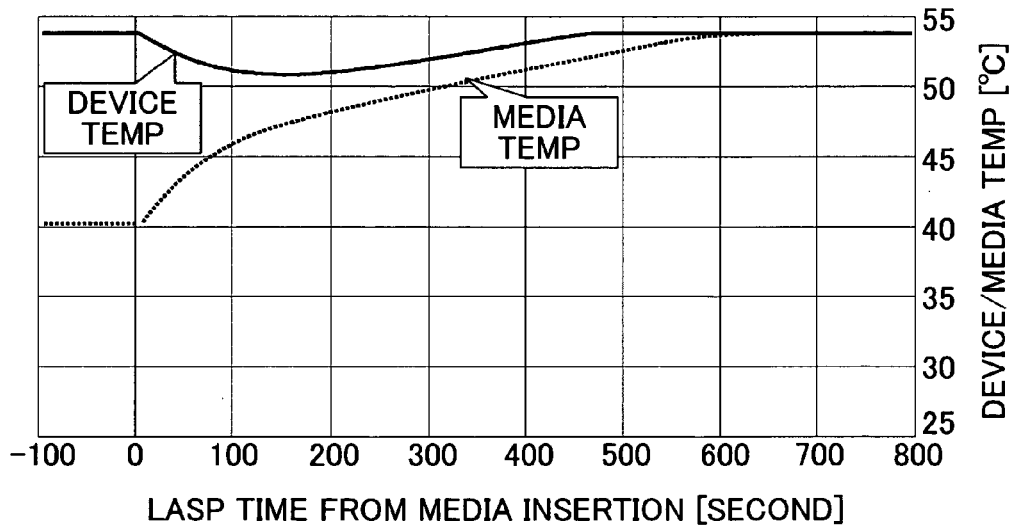
FIG. 4 is another diagram of changes in the temperature difference between the device and media of FIG. 2.

FIG. 2 shows the flow of media temperature estimation processing in an embodiment of the invention, FIG. 3 and FIG. 4 explain the operation of this processing, and FIG. 5 explains the media temperature estimation table of FIG. 2.

The flow of processing in FIG. 2 is explained below, referring to FIG. 3, FIG. 4 and FIG. 5.

(S10) The MPU 20 judges whether media 10 has been inserted from the output from a media insertion detector, not shown.

(S12) When insertion of media 10 is detected, the MPU 20 saves the detected temperature Tp1 of the temperature sensor 16 and the current time Tm1.

(S14) Next, the MPU 20 performs processing to load the media 10. That is, the spindle motor 12 which rotates media 10 is rotated, the laser diode of the optical fixed portion 15 is caused to emit light with prescribed read power, and the DSP 22 turns on the focusing servo, controls the focusing actuator, and performs focus adjustment. Next, the DSP 22 turns on the tracking servo, controls the tracking actuator, and performs tracking adjustment. Then, in a test zone of the media 10, the power value is raised successively from an initial value, write, write verify and erase operations are performed repeatedly, and adjustments are performed to obtain a write power adequate for writing and an accompanying erase power, until a state in which writing and reading are possible is reached.

(S16) Then, actual read/write processing is performed from the time at which a write/read command is issued by the higher-level host; but prior to this, the current detected temperature Tp1 of the temperature sensor 16 and the current time Tm1 are detected, and the previously detected temperature is changed to the previous temperature Tp2, while the previously detected time is changed to the previous time Tm2.

(S18) Next, the MPU 20 calculates the rate of temperature change c and the media temperature (initial temperature) Tpm using the following equations (1) and (2).

$$c = (Tp2 - Tp1)/(Tm2 - Tm1) \quad (1)$$

$$Tpm = \alpha * c + Tp1 \quad (2)$$

FIG. 3 and FIG. 4 plot the time elapsed from media insertion (seconds) on the horizontal axis, and the temperatures of the device and media (° C.) on the vertical axis, to show the change in the device temperature and media temperature. FIG. 3 shows the change in temperature in a case in which the temperature difference between device and media is comparatively large (for example, the device temperature is approximately 54° C., and the media temperature is approximately 25° C.); FIG. 4 shows the change in temperature for a comparatively small difference in the temperatures of the device and media (for example, the device temperature is approximately 54° C., and the media temperature is approximately 40° C.).

As shown in FIG. 3 and FIG. 4, when low-temperature media is inserted into the high-temperature device, due to the temperature of the high-temperature device, the temperature of the media rises; but the device temperature first falls due to the temperature difference with the low-temperature media, and then, as time passes, gradually recovers to the original temperature. At this time, the rate of change of the device temperature detected by the temperature sensor 16 differs depending on the temperature difference between device and media, and moreover is proportional to the temperature difference.

Hence as indicated by equation (2), by adding the rate of change of the device temperature c multiplied by a coefficient to the device temperature Tp1, the media temperature Tpm can be estimated.

Thereafter, one of the two tables 30 and 32 shown in FIG. 5 is referenced to estimate the media temperature. The table 30 in FIG. 5 stores changes in the media temperature (° C.) relative to the initial device temperature after different amounts of time have elapsed when the temperature difference is large (for example, 25° C.); the table 32 in FIG. 5 stores changes in the media temperature (° C.) relative to the initial device temperature after different lengths of time when the temperature difference is small (for example, 10° C.)

That is, as shown in FIG. 3 and FIG. 4, the change in temperature difference between device and media differs depending on the initial temperature difference, and so temperature difference change tables 30 and 32 are provided for cases in which the temperature difference is large and is small. Further, temperature differences are stored because if the temperature difference is the same, the change in temperature is also the same, regardless of the initial device temperature. The temperature differences stored in the tables 30 and 32 are determined through measurements in advance.

Hence in subsequent calculations of the estimated media temperature, first either table 30 or table 32 is selected according to the temperature difference between the initial device temperature and the initial media temperature, the media temperature relative to the initial device temperature is then read from table 30 or table 32 when time has elapsed from insertion of the media, and by adding the relative media temperature read from the table to the initial device temperature, the current estimated media temperature is obtained.

(S20) Next, the MPU 20 judges whether a command has been received from the higher-level host, and if a command has not been received, processing returns to step S16.

(S22) On the other hand, the MPU 20, on judging that a command has been received, judges whether the polarity of the rate of temperature change c has changed. As shown in FIG. 3 and FIG. 4, the rate of temperature change c of the device is negative from the time the media is inserted, and after a certain length of time changes to positive. While the rate of temperature change c is negative, there is substantial temperature change of both the device and the media, and moreover the temperature difference is large. On the other hand, when the rate of temperature change c becomes positive, the amount of temperature change decreases, and the temperature difference is small.

Hence in this invention, if the rate of temperature change c is positive, the W/R conditions described below may be returned from the modified special processing to the normal processing of normal W/R conditions. In order to ascertain the timing for this return, a judgment is made as to whether the rate of temperature return c has changed polarity. That is, if the rate of temperature change c is judged to have changed polarity, processing proceeds to the W (Write)/R (Read) processing under normal R/W conditions of step S28.

(S24) On the other hand, if the rate of temperature change c has not changed polarity, W/R processing is modified according to the temperature difference between device and media. That is, the difference between the device temperature detected in step S16 and the media temperature estimated in step S18 is calculated, and a judgment is made as to whether the absolute value of the temperature difference is greater than or equal to a first stipulated value. If the absolute value of the temperature difference is equal to or greater than the first stipulated value, then in essence W/R processing is not executed immediately, and processing returns to step S16. This processing is explained using FIG. 6, FIG. 7, and FIG. 8. These operations may be performed singly or in a plurality of combinations.

(S26) On the other hand, when the absolute value of the temperature difference is not equal to or greater than the first stipulated value, a judgment is made as to whether the temperature difference is greater than or equal to a second stipulated value (first predetermined value>second predetermined value). If the absolute value of the temperature difference is equal to or greater than the second predetermined value, the W/R processing is executed after changing the W/R conditions, and processing returns to step S16. This processing is explained using FIG. 9, FIG. 10, FIG. 11, and FIG. 12. These operations can be performed singly or in a plurality of combinations.

(S28) If the absolute value of the temperature difference is not greater than or equal to the second predetermined value, then the temperature difference is small, and so W/R processing is executed under normal W/R conditions, and processing returns to step S16.

Figure 13:
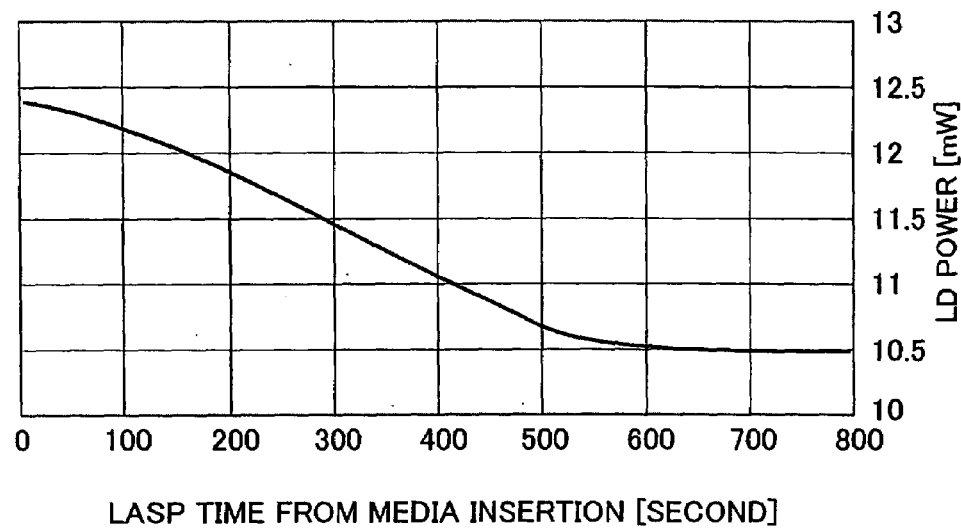

In this way, when the device temperature is high and the media temperature is low, because a temperature sensor is mounted within the device, when the low-temperature media is inserted the detected temperature falls according to the temperature difference, and after some time has elapsed the detected temperature returns to the original temperature. This temperature change also appears in the change in required write power shown in FIG. 13, and in the prior art it had been extremely difficult to accurately set the required write power, which changes from one moment to the next, so that errors resulted.

In this invention, in order to avoid the above situation, first, the temperature change is checked iteratively, and taking the rate of temperature change of the device as a parameter, the media temperature is estimated; when the difference with the device temperature is equal to or greater than a stipulated value, the write/read processing is switched. Second, changes in the polarity of the rate of temperature change are detected, and the write/read conditions are returned to the original conditions.

By this means, a single temperature sensor can be used to estimate the media temperature accurately and in a short length of time, and the write/read conditions can be returned to the original state safely and rapidly.

W/R Halt/Wait Processing

Figure 6:
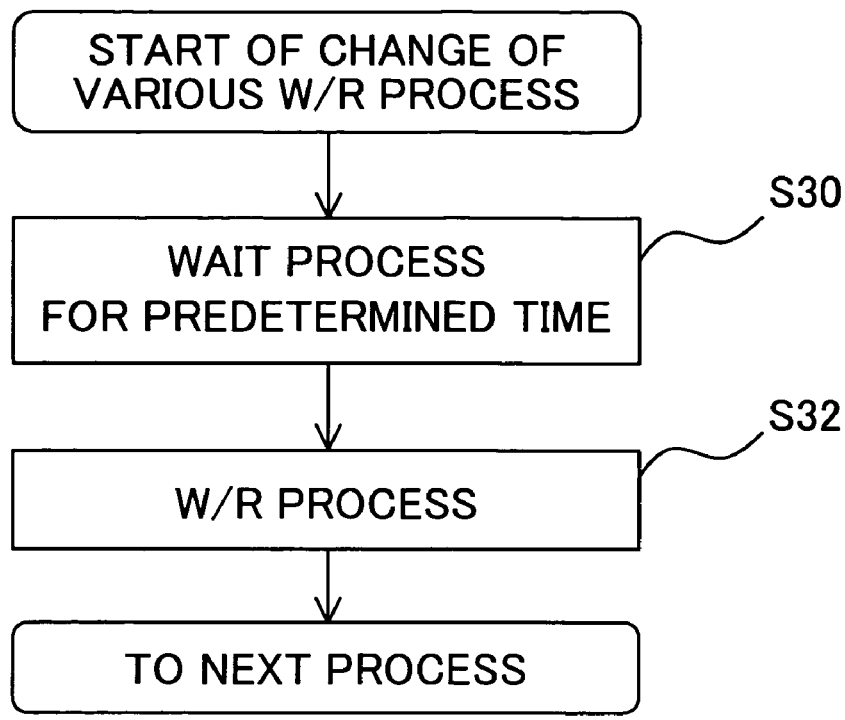
FIG. 6 shows the flow of processing in a first embodiment of the halt processing of FIG. 2.

Next, the W/R halt/wait processing of FIG. 2 is explained. FIG. 6 shows the flow of processing of a first embodiment of the W/R halt/wait processing of FIG. 2.

(S30) Waiting continues for a predetermined length of time.

(32) After waiting, W/R processing is performed under normal W/R conditions.

As shown in the above FIG. 3 and FIG. 4, when in this method a prescribed length of time (for example, 200 seconds) has elapsed from media insertion, the temperature difference between device and media has become small, and so by waiting the prescribed length of time, W/R processing is possible under normal conditions. In this case, it is preferable that this wait state be displayed by a device indicator and on the display of the higher-level device.

Figure 7:
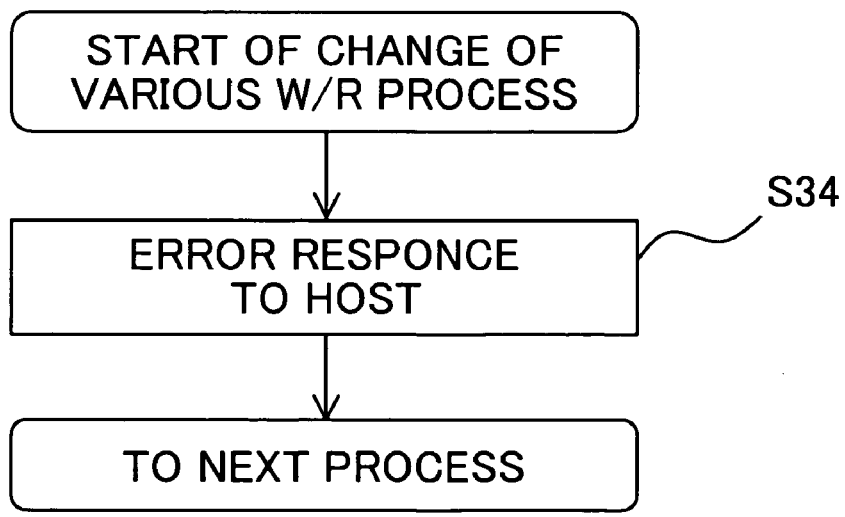
FIG. 7 shows the flow of processing in a second embodiment of the halt processing of FIG. 2.

FIG. 7 shows the flow of processing in a second embodiment of the W/R halt/wait processing of FIG. 2.

(34) An error response is returned to the higher-level device, and processing ends.

In this method, when the temperature difference is such that W/R processing with assurance of data integrity cannot be performed immediately even when the W/R conditions (for example, the write power) are changed, an error is returned to the host to indicate this state.

Figure 8:
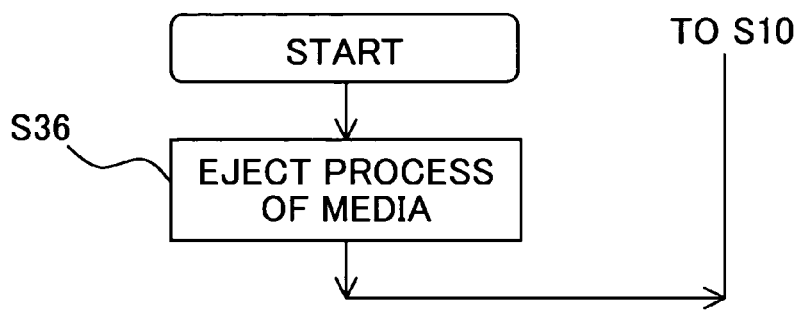
FIG. 8 shows the flow of processing in a third embodiment of the halt processing of FIG. 2.

FIG. 8 shows the flow of processing in a third embodiment of the W/R halt/wait processing of FIG. 2.

(S36) The media is ejected, halt processing ends, and processing returns to step S10 in FIG. 2.

In this method, when the temperature difference is such that W/R processing cannot be performed immediately with data integrity assured even when the W/R conditions (for example, the write power) changed, the media is ejected and processing is halted. In this case, the device responds to the host with a media ejection message.

These operations may be performed singly or in a plurality of combinations as necessary. For example, in the second embodiment, when prioritizing safety, it is to respond an error to the host immediately, to prevent data loss.

In the first embodiment, in order to prioritize safety, write/read execution is executed only after waiting for a stipulated length of time. It is expected that the temperature difference between media and device will become small during the wait period. In a third embodiment, in order to prioritize safety, the media is ejected, to prevent data destruction due to light from the laser diode in the worst case in which the temperature difference is considerable.

W/R Condition Switching Processing

Figure 9:
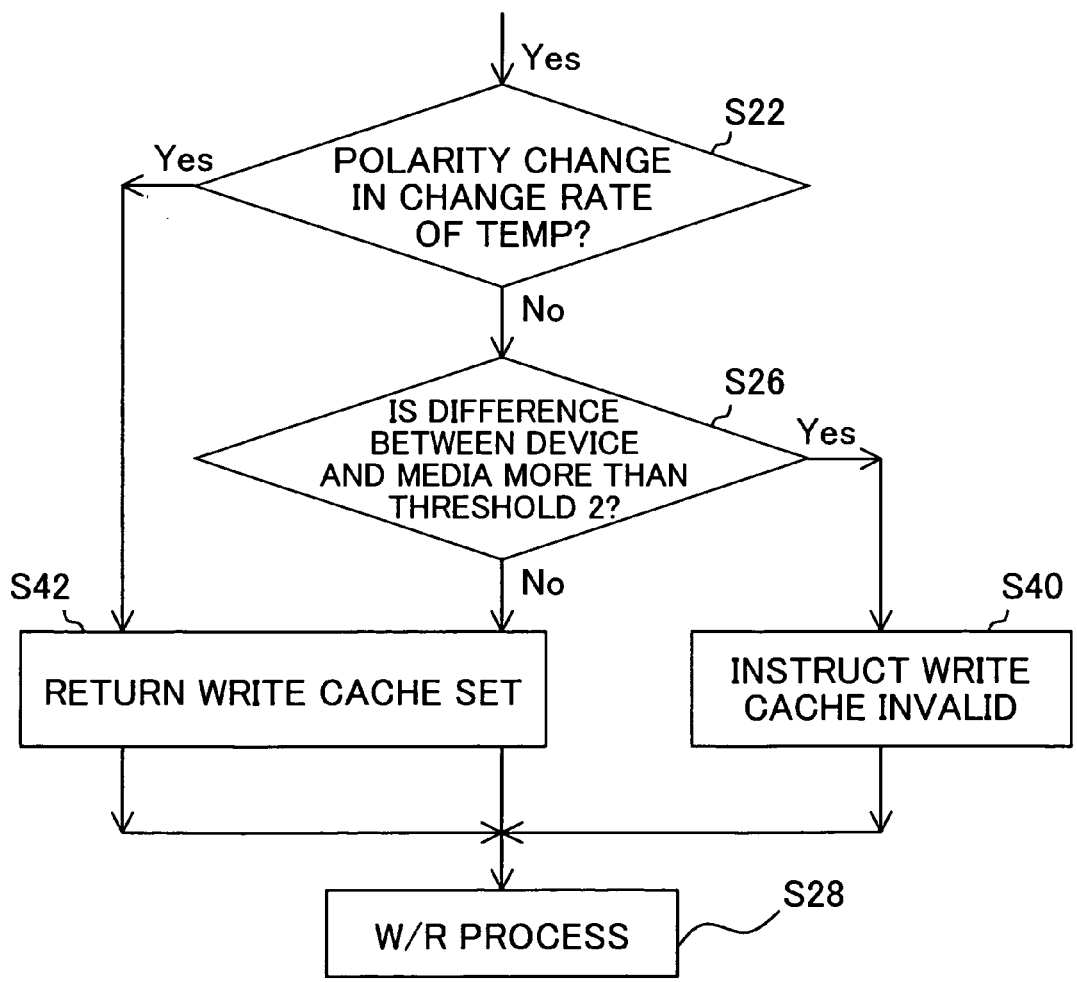
FIG. 9 shows the flow of processing in a first embodiment of the W/R condition modification processing of FIG. 2.

Next, the W/R condition switching processing of FIG. 2 is explained. FIG. 9 shows the flow of processing of a first embodiment of the W/R condition switching processing of FIG. 2.

(S40) When the temperature difference between the device temperature and media temperature is equal to or greater than the second predetermined value, an instruction is issued to disable the write cache in advance. The write cache is cache memory provided, for example, in the DRAM 27 in FIG. 1 in order to improve access speed; data to be written to the media is stored temporarily in cache memory without being written immediately to the media, and when there is no access, all the data in the write cache is written to the media. W/R processing is then performed under the normal conditions of step S28.

(S42) If on the other hand a change in the polarity of the rate of temperature change c is detected in step S22 of FIG. 2, also shown in FIG. 9, and if moreover in step S26 it is judged that the temperature difference between device and media is not equal to or greater than the second predetermined value, then the write cache setting is restored, and W/R processing is performed under the normal conditions of step S28.

Figure 10:
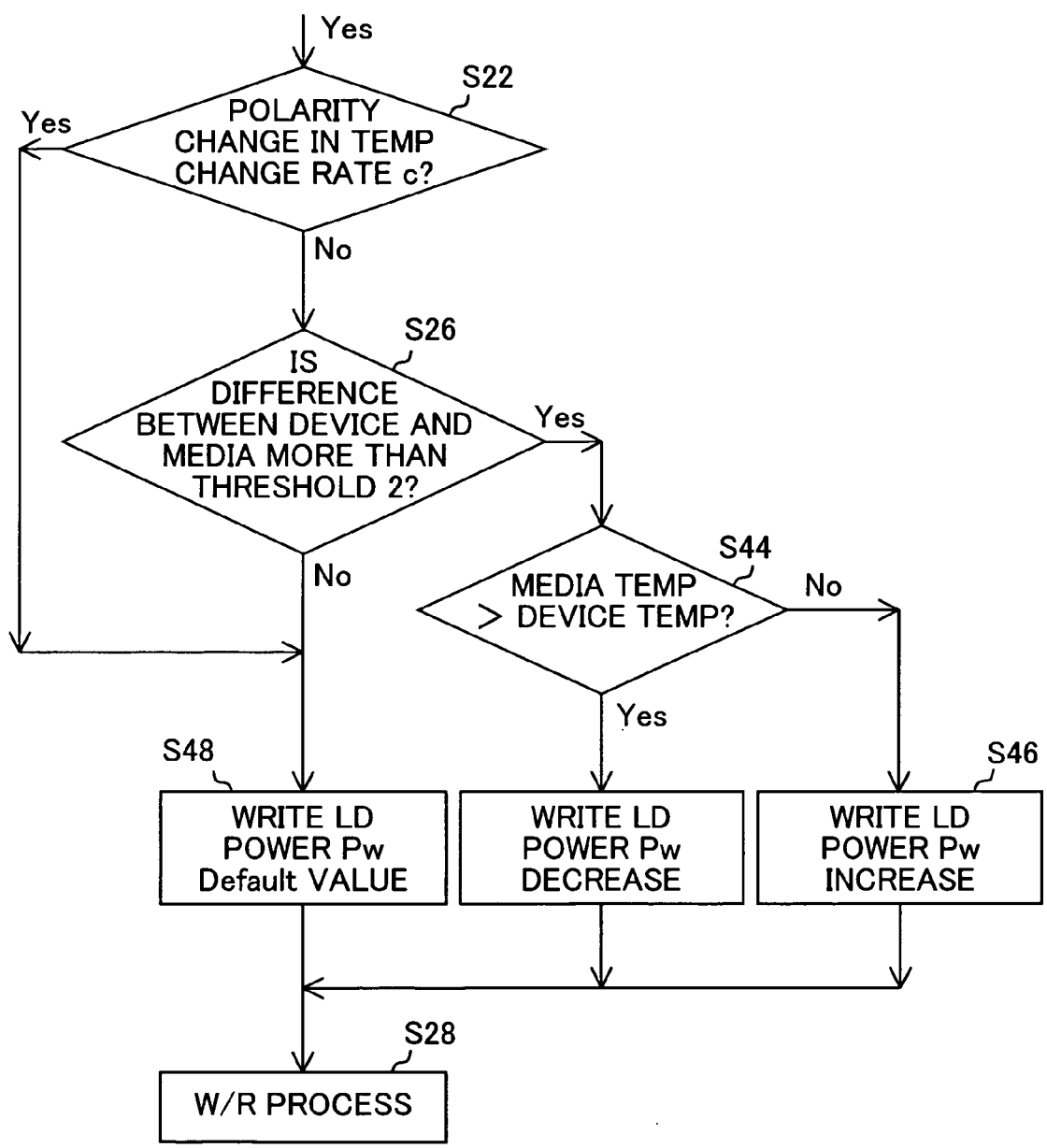
FIG. 10 shows the flow of processing in a second embodiment of the W/R condition modification processing of FIG. 2.

FIG. 10 shows the flow of processing of a second embodiment of the W/R condition switching processing of FIG. 2.

(S44) When the temperature difference between device and media is equal to or greater than the second predetermined value, a judgment is made as to whether the media temperature is higher than the device temperature. If higher, the laser power during writing (write power) Pw is reduced, and processing advances to the W/R processing of step S28.

(S46) If the media temperature is not higher than the device temperature, the laser power during writing (write power) Pw is increased, and processing advances to the W/R processing of step S28.

(S48) On the other hand, in step S22 of FIG. 2, also shown in FIG. 10, when a change in polarity of the rate of temperature change c is detected, and when moreover in step S26 the temperature difference between device and media is judged not to be equal to or greater than the second stipulated value, the laser power during writing (write power) Pw is returned to the default value, and processing advances to the W/R processing of step S28.

Figure 11:
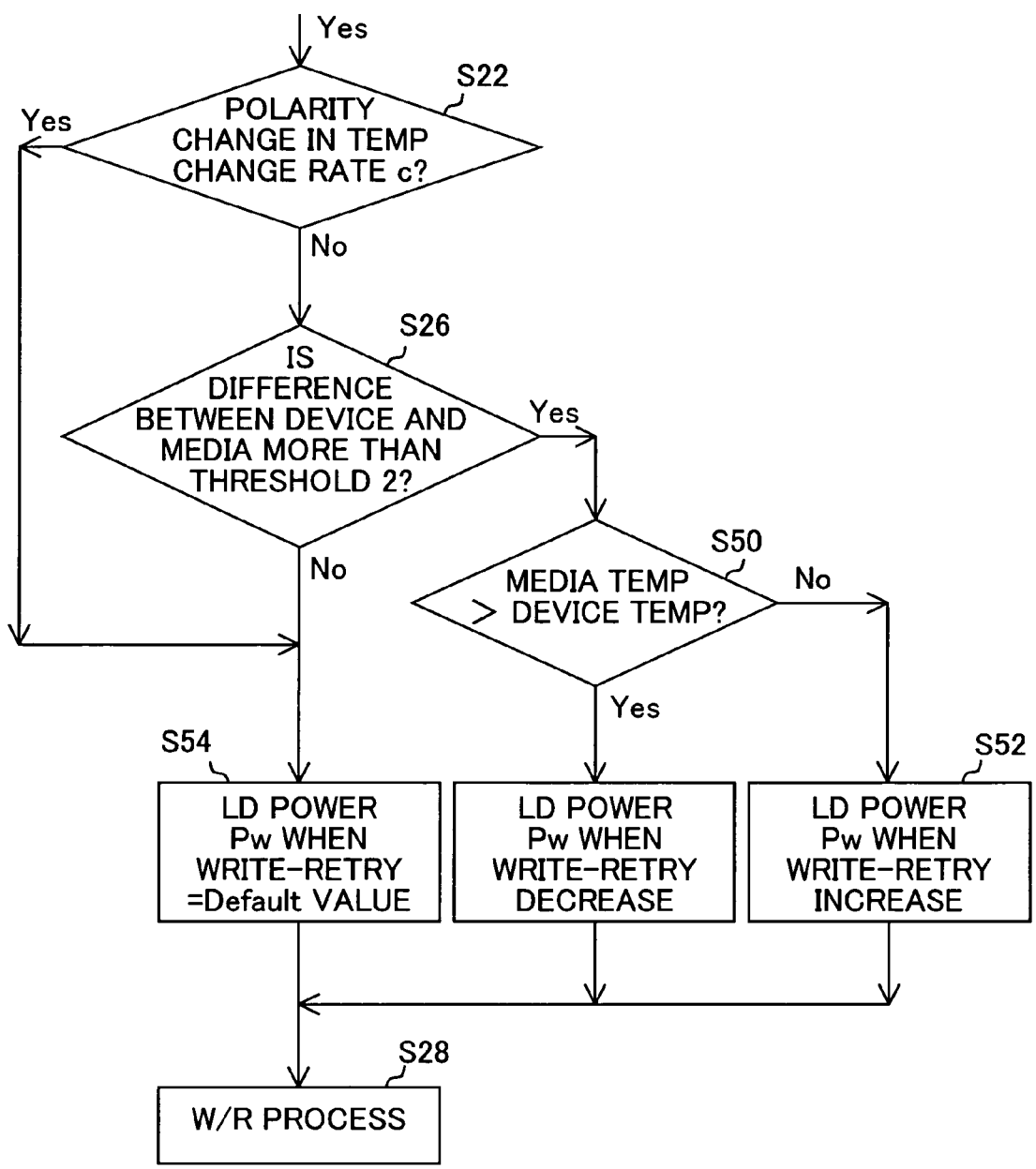
FIG. 11 shows the flow of processing in a third embodiment of the W/R condition modification processing of FIG. 2.

FIG. 11 shows the flow of processing in a third embodiment of the W/R condition switching processing of FIG. 2.

(S50) When the temperature difference between device and media is equal to or greater than the second predetermined value, a judgment is made as to whether the media temperature is higher than the device temperature. If higher, the laser power during write retry (the write retry power) Pw is reduced, and processing advances to the W/R processing of step S28. That is, when during writing a write error occurs during normal write processing, a write retry is performed. Here, the write power during write retry is adjusted.

(S52) If the media temperature is not higher than the device temperature, the laser power during write retry (write retry power) Pw is increased, and processing advances to the W/R processing of step S28.

(S54) If on the other hand a change in polarity of the rate of temperature change c is detected in step S22 of FIG. 2, also shown in FIG. 11, and if moreover in step S26 the temperature difference between device and media is judged not to be equal to or greater than the second predetermined value, then the laser power during write retry (write retry power) Pw is returned to the default value, and processing advances to the W/R processing of step S28.

Figure 12:
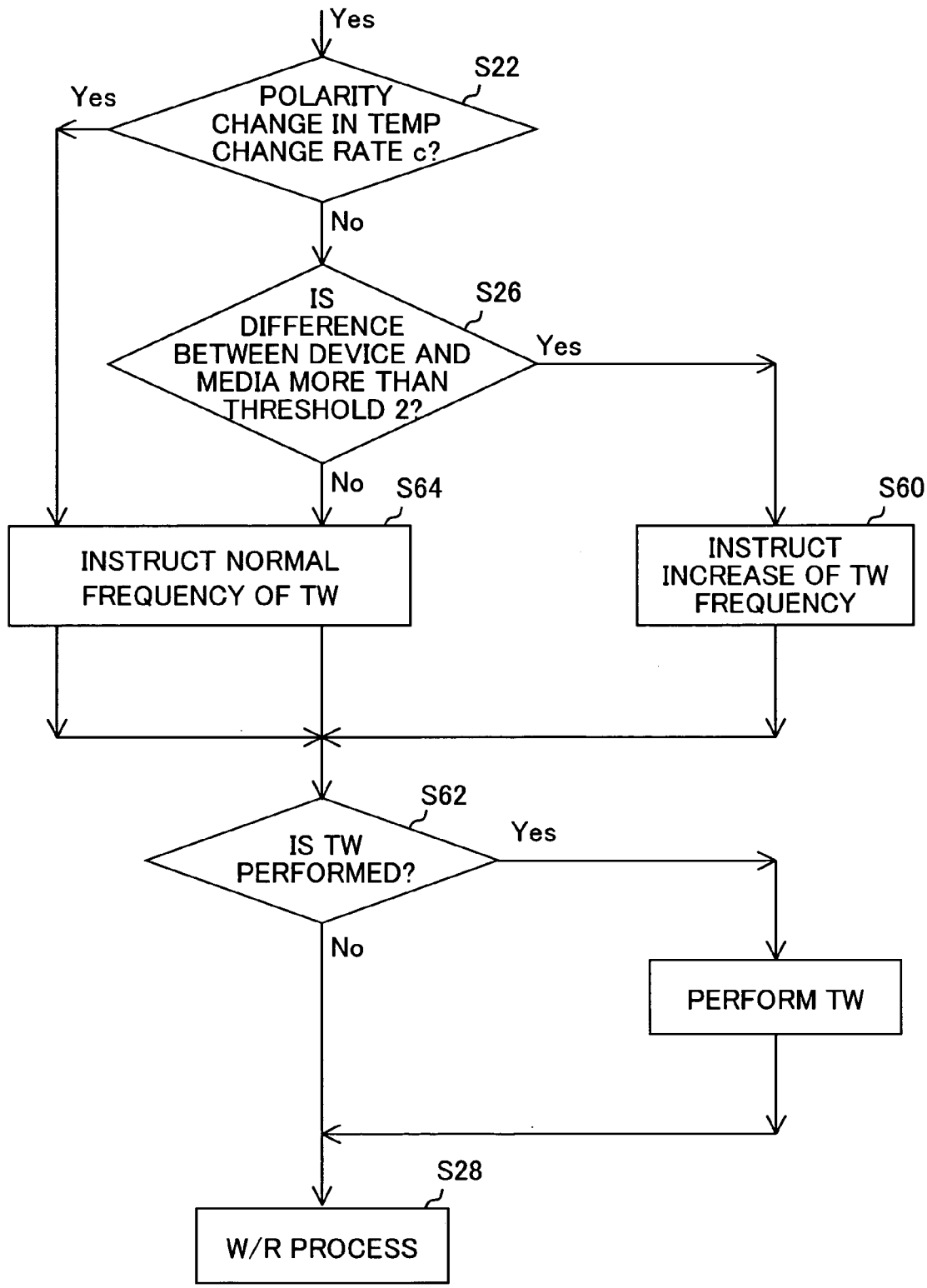
FIG. 12 shows the flow of processing in a fourth embodiment of the W/R condition modification processing of FIG. 2; and, FIG. 13 is a diagram of changes with time in the required write power when low-temperature media is inserted into a high-temperature device.

FIG. 12 shows the flow of processing in a fourth embodiment of the W/R condition switching processing of FIG. 2.

(S60) When the temperature difference between device and media is equal to or greater than the second predetermined value, the test write frequency is increased, and processing advances to step S62. Test writing is processing in which data is written at the default laser power to a non-user area of the media with preset frequency, and the data is then read, and the write power adjusted.

(S62) A judgment is made as to whether the current time is a time to execute test writing. If so, test writing is executed, and the write power is adjusted. Processing then advances to the W/R processing of step S28.

(S64) If on the other hand a change in the polarity of the rate of temperature change c is detected in step S22 of FIG. 2, also shown in FIG. 12, and if moreover in step S26 the temperature difference between device and media is judged not to be equal to or greater than the second predetermined value, then the test write frequency is returned to normal, and processing advances to the W/R processing of step S28.

Through such W/R condition switching processing, appropriate write operation can be realized according to the temperature of the media. These four processing operations can be realized either singly or in combination, as necessary.

For example, in the first embodiment, in order to prioritize safety, the device write cache is disabled, so that even if a write failure were to occur, damage would be kept to a minimum, and the loss of a large amount of data would be prevented. In the second, third and fourth embodiments, the write power is increased or decreased, the write power during write retry is increased or decreased, and the frequency of test writing is increased compared with normal, in order to reduce write power shifts.

Other Embodiments

In the above, embodiments of the invention have been explained; but various modifications to the invention are possible within the scope of the invention, and these are not excluded from the technical scope of the invention. For example, an optical storage device and optical storage media were explained for the case of magneto-optical disks; but application to dye-type disks, phase-change disks, and other media is also possible. Further, optical storage media may be in card or other shapes as well as in disk shapes.

INDUSTRIAL APPLICABILITY

In this invention, the rate of temperature change is calculated from the output of a temperature sensor which detects the temperature of the device, and operation is returned from special processing in a state in which there is a temperature difference to normal processing, so that a return to normal processing can be made safely and quickly. Further, the media temperature is estimated from the rate of temperature change for a single temperature sensor, so that the media temperature can be estimated quickly and comparatively accurately, and the wait time to access the media can be shortened.

Further, in the case of a MSR (Magnetic Super Resolution) or other type optical disk, the media temperature can be estimated even when sensitivity shift or other characteristic changes occur, and there is no need for a media temperature sensor in addition to the device temperature sensor, so that causes of increases in equipment costs can be eliminated.

The invention claimed is:

1. A data assurance method for optical storage media, in an optical storage device which optically reads from and writes to inserted removable optical storage media, comprising the steps of:
    detecting a temperature of said optical storage device using a temperature sensor;
    calculating a rate of temperature change from said detected temperature;
    determining an estimated temperature of said optical storage media based on said rate of temperature change;
    changing, according to a temperature difference between the device temperature of said temperature sensor and said estimated temperature, at least the write conditions, for an optical head to perform said reading and writing, from normal conditions to special conditions suited to said temperature difference; and
    detecting a change in a polarity of said rate of temperature change, and returning from said special conditions to said normal conditions if the polarity has changed.

2. The data assurance method for optical storage media according to claim 1, wherein said step of determine the estimated temperature comprises the steps of:
    calculating, at the time of insertion of said optical storage media, the initial estimated temperature of said optical storage media from said rate of temperature change and from the initial temperature of said device; and
    referencing a table storing temperature differences of said media relative to the temperature of said device taking the time elapsed from insertion of said optical storage media as a parameter, according to the temperature difference between the initial temperature of said device and said initial estimated temperature, and determining the estimated temperature of said optical storage media after insertion of said optical storage media.

3. The data assurance method for optical storage media according to claim 1, wherein further comprising a step of preventing the execution of read/write processing of said optical storage media when the temperature difference between said detected device temperature and said estimated temperature of the optical storage media is equal to or greater than a first predetermined value,
    and wherein said changing step is executed when said temperature difference is smaller than said first predetermined value and greater than or equal to a second predetermined value.

4. The data assurance method for optical storage media according to claim 1, wherein said changing step comprises a step of increasing or decreasing the write power for said optical head, according to said temperature difference.

5. The data assurance method for optical storage media according to claim 1, wherein said changing step comprises a step of increasing or decreasing the write power for said optical head during write retry, according to said temperature difference.

6. The data assurance method for optical storage media according to claim 1, wherein said changing step comprises a step of changing the frequency of test writing to adjust the write power for said optical head, according to said temperature difference.

7. The data assurance method for optical storage media according to claim 1, wherein said changing step comprises a step of disabling a write cache operation which stores said write data in cache memory, according to said temperature difference.

8. The data assurance method for optical storage media according to claim 3, wherein said prevention step comprises a step of sending an error response to a higher-level device.

9. The data assurance method for optical storage media according to claim 3, wherein said changing step comprises a step of ejecting said inserted optical storage media.

10. The data assurance method for optical storage media according to claim 1, wherein said changing step comprises a step of performing said read or write processing after a prescribed wait time.

11. An optical storage device, which optically reads from and writes to inserted removable optical storage media, comprising:
    a temperature sensor which detects the temperature of said optical storage device;
    an optical head which reads from and writes to said optical storage media; and a control unit which controls said optical head, and wherein said control unit calculates a rate of temperature change from said detected temperature, determines an estimated temperature of said optical storage media based on said rate of temperature change, changes, according to a temperature difference between the device temperature of said temperature sensor and said estimated temperature, at least the write conditions for said optical head from normal conditions to special conditions suited to said temperature difference, detects a change in a polarity of said rate of temperature change, and returns said conditions from said special conditions to said normal conditions if the polarity has changed.

12. The optical storage device according to claim 11, wherein said control unit has a table which stores temperature differences of said media relative to the temperature of said device taking the time elapsed from insertion of said optical storage media as a parameter, according to the temperature difference between the initial temperature of said device and said initial estimated temperature, and wherein said control unit calculates, at the time of insertion of said optical storage media, an initial estimated temperature of said optical storage media from said rate of temperature change and said device initial temperature, and after insertion of said optical storage media, references said table and determines the estimated temperature of said optical storage media.

13. The optical storage device according to claim 11, wherein, when the temperature difference between said detected device temperature and said estimated temperature of the optical storage media is equal to or greater than a first stipulated value, said control unit prevents the execution of read/write processing of said optical storage media, and wherein, when said temperature difference is smaller than said first predetermined value and greater than or equal to a second predetermined value, said control unit performs modification to said special conditions.

14. The optical storage device according to claim 11, wherein said control unit increases or decreases the write power for said optical head, according to said temperature difference.

15. The optical storage device according to claim 11, wherein said control unit increases or decreases the write power during write retry for said optical head, according to said temperature difference.

16. The optical storage device according to claim 11, wherein said control unit changes the frequency of test writing to adjust the write power for said optical head, according to said temperature difference.

17. The optical storage device according to claim 11, wherein said control unit disables a write cache operation which stores said write data in cache memory, according to said temperature difference.

18. The optical storage device according to claim 13, wherein said control unit sends an error response to a higher-level device.

19. The optical storage device according to claim 13, wherein said control unit ejects said inserted optical storage media.

20. The optical storage device according to claim 11, wherein said control unit performs said read or write processing after a prescribed wait time.

* * * * *